US011312813B2

(12) United States Patent
Assemat et al.

(10) Patent No.: US 11,312,813 B2
(45) Date of Patent: Apr. 26, 2022

(54) INFILL COATED WITH A POLYURETHANE PREPOLYMER AND ARTIFICIAL TURF SURFACES INCLUDING THE SAME

(71) Applicant: Dow Global Technologies LLC, Midland, MI (US)

(72) Inventors: Virginie Assemat, Erstein (FR); Andrea Benvenuti, Correggio (IT); Amber Marie Stephenson, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 233 days.

(21) Appl. No.: 16/486,900

(22) PCT Filed: Feb. 22, 2018

(86) PCT No.: PCT/US2018/019192
§ 371 (c)(1),
(2) Date: Aug. 19, 2019

(87) PCT Pub. No.: WO2018/156743
PCT Pub. Date: Aug. 30, 2018

(65) Prior Publication Data
US 2021/0130531 A1 May 6, 2021

(30) Foreign Application Priority Data
Feb. 23, 2017 (EP) ..................................... 17425019

(51) Int. Cl.
*C08G 18/10* (2006.01)
*C08G 18/48* (2006.01)
(Continued)

(52) U.S. Cl.
CPC .......... *C08G 18/4837* (2013.01); *C08G 18/10* (2013.01); *C08G 18/302* (2013.01);
(Continued)

(58) Field of Classification Search
CPC .. C08G 18/4837; C08G 18/10; C08G 18/302; C08G 18/7671; C09D 175/08
See application file for complete search history.

(56) References Cited

U.S. PATENT DOCUMENTS 4,112,176 A * 9/1978 Bailey ....................... B32B 5/16
428/95
5,514,722 A 5/1996 Di Geronimo
(Continued)

FOREIGN PATENT DOCUMENTS

CN   1329116 A   1/2002
CN   1678797 A   10/2005
(Continued)

OTHER PUBLICATIONS

Search Report dated Dec. 30, 2020, pertaining to Chinese Patent Application No. 201880011146.2.
(Continued)

*Primary Examiner* — Michael L Leonard
(74) *Attorney, Agent, or Firm* — Dinsmore & Shohl LLP

(57) ABSTRACT

In various embodiments, coated infill includes a plurality of infill granules and a preformed coating on the infill granules including a cured polyurethane product of at least one polyurethane prepolymer component and a curative component. The polyurethane prepolymer component includes a reaction product of an isocyanate component including diphenylmethane diisocyanate (MDI) and a polyol component, and has a free isocyanate content (% NCO) from 2 wt % to 12 wt %. The curative component includes water. Methods for making an artificial turf surface using the coated infill are also provided.

12 Claims, 4 Drawing Sheets

(51) Int. Cl.
*E01C 13/08* (2006.01)
*C08J 7/04* (2020.01)
*C08G 18/30* (2006.01)
*C08G 18/76* (2006.01)
*C09D 175/08* (2006.01)

(52) U.S. Cl.
CPC ........ *C08G 18/7671* (2013.01); *C08J 7/0427* (2020.01); *C09D 175/08* (2013.01); *E01C 13/08* (2013.01)

(56) References Cited

U.S. PATENT DOCUMENTS

| | | | |
|---|---|---|---|
| 8,568,852 | B2 | 10/2013 | Smit et al. |
| 8,795,834 | B2 | 8/2014 | Tetrault et al. |
| 2002/0013426 | A1 | 1/2002 | Toyofuku et al. |
| 2006/0100342 | A1 | 5/2006 | Jensen |
| 2012/0183705 | A1 | 7/2012 | Chereau et al. |
| 2012/0258811 | A1* | 10/2012 | Tetrault .................. B01J 20/26 472/92 |
| 2014/0128507 | A1 | 5/2014 | Burckhardt et al. |
| 2016/0333535 | A1 | 11/2016 | Robinson et al. |

FOREIGN PATENT DOCUMENTS

| | | | |
|---|---|---|---|
| CN | 103687883 A | 3/2014 | |
| CN | 105131311 A | 12/2015 | |
| DE | 4236562 A1 | 5/1994 | |
| EP | 760834 B1 | 10/1998 | |
| EP | 3294789 B1 | 5/2016 | |
| JP | 2013244964 A | 12/2013 | |
| WO | WO-2018019732 A1 * | 2/2018 | ............. E01C 13/02 |

OTHER PUBLICATIONS

Office Action dated Jan. 6, 2021, pertaining to Chinese Patent Application No. 201880011146.2.
International Search Report and Written Opinion pertaining to PCT/US2018/019192, dated Jun. 5, 2018.
European Search Report pertaining to corresponding European Patent Application No. 17425019.1, dated Sep. 13, 2017.
Dow, "Polyurethane Technology: Artificial Turf Case Study," www.dowartificialturf.com, published Oct. 2007.

* cited by examiner

INFILL COATED WITH A POLYURETHANE PREPOLYMER AND ARTIFICIAL TURF SURFACES INCLUDING THE SAME

CROSS REFERENCE TO RELATED APPLICATION

This application claims the benefit of European Patent Application Serial No. 17425019.1 filed Feb. 23, 2017, which is hereby incorporated by reference in its entirety.

TECHNICAL FIELD

Embodiments of the present disclosure are generally related to polyurethanes, and are specifically related to hydrophilic polyurethanes used to control temperatures of surfaces.

BACKGROUND

Synthetic or artificial turfs are increasingly being used as an alternative to natural grass turf for use on sport athletic fields, playgrounds, landscaping, and in other leisure applications. Typical artificial turf surfaces include turf yarns or fibers extending upward from a substrate. Infill material dispersed between the turf yarns or fibers maintain the turf yarns or fibers in an upright condition and provide some traction and energy absorption.

However, the infill can contribute to a temperature increase of the artificial turf surface, which may present a risk of thermal injury to players both through direct skin contact and heat exhaustion. To control the temperature on the artificial turf surface, the endotherm of water evaporation has been employed using ceramic beads. Alternatively, light color coatings on rubber infill particles have been employed. However, these infills have limited water holding capacity and/or limited impact on the temperature drop on the artificial turf surface.

Accordingly, there is a need for alternative infills that can be used to control the temperature of the artificial turf surface.

SUMMARY

According to one embodiment, a coated infill includes a plurality of infill granules and a preformed coating on the infill granules. The preformed coating is a cured polyurethane product of at least a polyurethane prepolymer component and a curative component. The polyurethane prepolymer component includes at least one polyurethane prepolymer that includes a reaction product of an isocyanate component that includes diphenylmethane diisocyanate (MDI) and a polyol component, the polyurethane prepolymer having a free isocyanate content (% NCO) from 2 wt % to 12 wt %. The curative component includes at least water.

DETAILED DESCRIPTION

Figure 1:
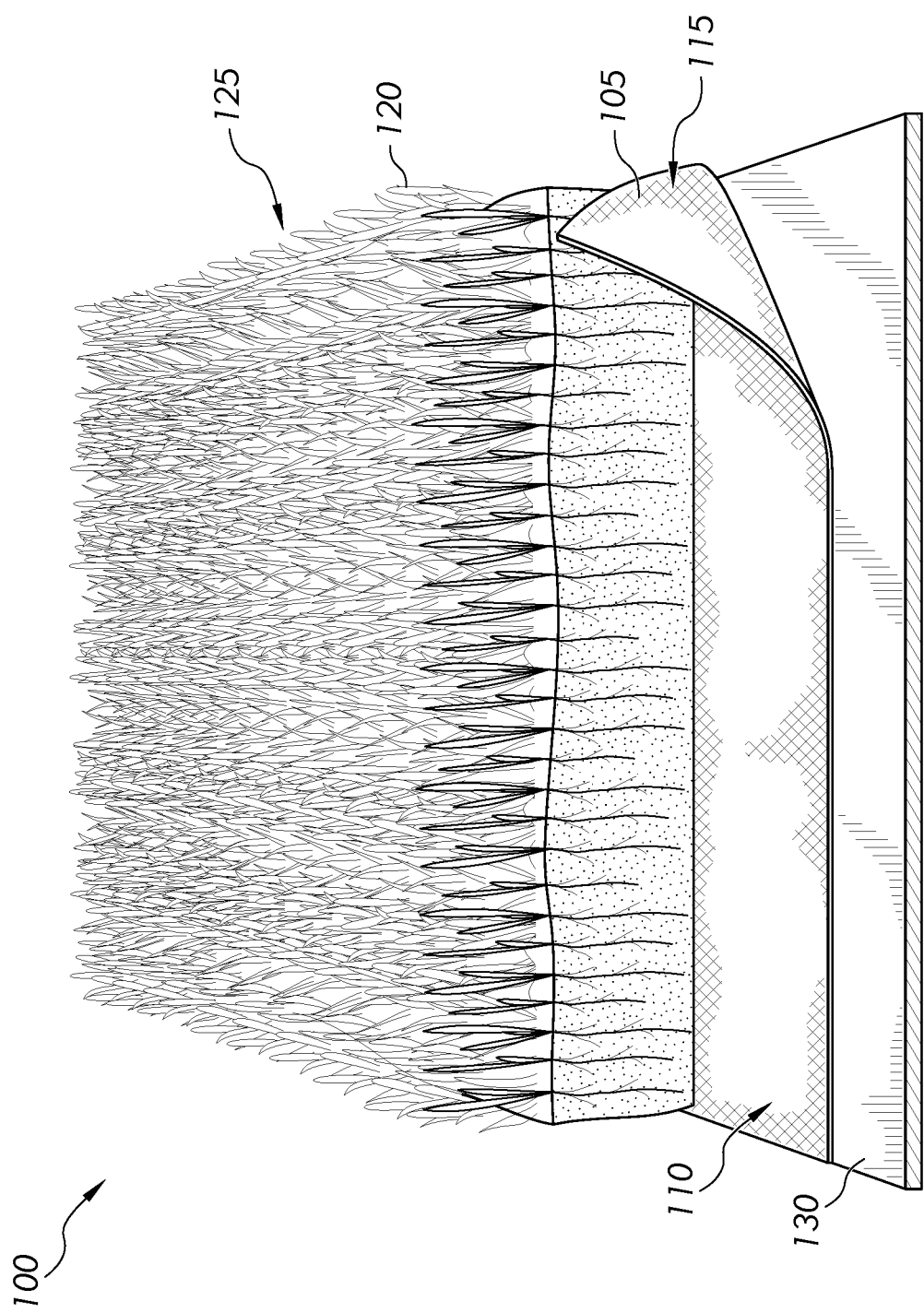
FIG. 1 schematically depicts a cutaway view of an artificial turf field according to one or more embodiments shown and described herein.

Various embodiments are directed to coated infills including infill granules coated with a cured polyurethane product of at least a polyurethane prepolymer component and a curative component. The polyurethane prepolymer component includes at least one polyurethane prepolymer that includes a reaction product of an isocyanate component that includes diphenylmethane diisocyanate (MDI) and a polyol component, the polyurethane prepolymer having a free isocyanate content (% NCO) from 2 wt % to 12 wt %. The curative component includes at least water. As used herein, the term "preformed coating" refers to a coating that is formed in a process separate from the introduction of the coated infill into an end use application such as use as a component in the artificial turf surface. In other words, the term preformed coatings means the coating is cured by using at least water as a curative prior to introduction of the coated infill into the end use application.

In various embodiments, the preformed coating on the infill retains water for a longer period of time so as to prolong the cooling effect as compared to standard, uncoated rubber infill, by allowing for controlled release of the water. For example, damp, non-coated infill may reach temperatures around 40° C. after 20 minutes under exposure to infrared light. However, according to exemplary embodiments, damp infill with the preformed coating may be able to maintain temperatures under 40° C. for longer periods of time, such as for around 90 minutes under exposure to infrared light. Accordingly, the infill with the preformed coating may prolong the cooling effect associated with water that is applied to the artificial turf, as compared to using standard, uncoated rubber infill.

In various embodiments, the infill includes a core in the form of infill granules. Infill granules may include rubber or elastomer granules or sand (e.g., silica), in some embodiments. The rubber or elastomer granules may be granulated rubber particles like SBR (styrene-butadiene rubber) (e.g., such as recycled from car tires), EPDM (ethylene-propylene-diene monomer), other vulcanized rubbers or rubber recycled from belts, thermoplastic elastomers (TPEs) and thermoplastic vulcanizates (TPVs). For example, the rubber or elastomer granules may include an ethylene/α-olefin/diene interpolymer, an isoprene rubber, a natural rubber, a butadiene rubber, a styrene-butadiene rubber, an ethylene/propylene rubber, a silicone rubber, or a combination thereof. In embodiments, the infill includes a core of styrene-butadiene rubber (SBR) granules. As used herein, the term "styrene-butadiene copolymer," "styrene-butadiene rubber," or "SBR" means a copolymer manufactured from styrene and 1,3-butadiene monomers.

Suitable styrene-butadiene rubbers include, but are not limited to, cold polymerized emulsion SBR and solution polymerized SBR. In various embodiments, the SBR may have a Mooney Viscosity (ML 1+4 at 100° C.) greater than or equal to 10, greater than or equal to 15, or greater than or equal to 20. The SBR may have a Mooney Viscosity (ML 1+4 at 100° C.) less than or equal to 200, less than or equal to 150, or less than or equal to 100. In embodiments, the SBR may have a Mooney Viscosity (ML 1+4 at 100° C.) from 10 to 200, from 15 to 150, or from 20 to 100.

The SBR may comprise from 20 to 100% by weight, or 40 to 80% by weight of the 1,3-butadiene monomers. Conversely, the SBR may comprise from 0 to 80% by weight, or 10 to 50% by weight of styrene monomers. The SBR may be a random copolymer or block copolymer. In specific embodiments, the copolymer is a random styrene butadiene copolymer. Commercial examples of suitable SBR granules include POWERFILL™ available from GommAmica (Italy).

In various embodiments, the infill granules are coated with a preformed coating that includes the reaction product of a composition that includes a polyurethane prepolymer component and a curative component including water. In various embodiments, from 1 wt % to 20 wt % of the polyurethane prepolymer component is used to form the preformed coating based on a total weight of the plurality of infill granules and polyurethane prepolymer component. In some embodiments, from 5 wt % to 10 wt %, from 5 wt % to 12 wt %, or from 5 wt % to 15 wt % of the polyurethane prepolymer component is used to form the preformed coating based on a total weight of the plurality of infill granules and polyurethane prepolymer component. The polyurethane prepolymer component of various embodiments includes a polyurethane prepolymer that is a reaction product of a composition that includes an isocyanate component (that includes at least diphenylmethane diisocyanate (MDI)) and a polyol component (that includes at least one polyol). The polyurethane prepolymer component includes at least one isocyanate-terminated prepolymer. The isocyanate-terminated prepolymer generally has a free isocyanate content (% NCO) of greater than or equal to 2 wt % and generally less than or equal to 12 wt %. For example, the isocyanate-terminated prepolymer may have a free isocyanate content of from 2 wt % to 12 wt %, or from 5 wt % to 10 wt %. In some embodiments, polyisocyanate can be back blended into the prepolymer to reach a desired free NCO content. In other words, polyisocyanate can be added to the prepolymer to adjust the NCO content to the desired level.

In various embodiments, the isocyanate component contains polymeric MDI and/or mixtures of different isomers of MDI, for example, 2,4'-diphenylmethane diisocyanate (2,4' isomer of MDI) and 4,4'-diphenylmethane diisocyanate (4,4' isomer of MDI). The 2,4' and 4,4' isomers of MDI may be present in the isocyanate component in a weight ratio from 1:100 to 50:50. For example, the 2,4' isomer of MDI may be present in an amount from 1 wt % to 50 wt % (e.g., 1.25 wt % to 50 wt %, 1.3 wt % to 35 wt %, 1.5 wt % to 30 wt %, etc.), based on a total weight of the isocyanate component. A weight percentage of the 4,4' isomer of MDI may be greater than a weight percentage of the 2,4' isomer of MDI, based on a total weight of the isocyanate component. For example, a formulation for forming the MDI based prepolymer has a 2,4' isomer MDI content from 1.5 wt % to 40 wt % (e.g., 1.5 wt % to 30 wt %) and a remainder of the 4,4' isomer of MDI based on a total weight of 100 wt % of the formulation for forming the polyurethane prepolymer. According to some embodiments, a balance of the isocyanate component that is not accounted for with the 4,4' isomer of MDI and/or the 2,4' isomer of MDI may include toluene diisocyanate (TDI), hexamethylene diisocyanate (HDI), isophorone diisocyanate (IIPDI), polymethylene polyphenylisocyanate, carbodiimide or allophonate or uretonimine adducts of methylene diphenylisocyanate and mixtures thereof.

Examples of commercial isocyanates suitable for use in various embodiments include the aromatic isocyanates commercially available under the trademark ISONATE™, such as ISONATE™ M125 and ISONATE™ 50 O,P', all available from The Dow Chemical Company (Midland, Mich.).

In various embodiments, the polyol component includes at least one polyether polyol. The polyether polyol used to prepare the polyurethane prepolymer includes one or more polyether polyols and a hydroxyl number of from 10 mg KOH/g to 700 mg KOH/g. In still other embodiments, the polyether polyol composition has a hydroxyl number of from 15 mg KOH/g to 100 mg KOH/g, or from 20 mg KOH/g to 50 mg KOH/g. As used herein, a hydroxyl number is the milligrams of potassium hydroxide equivalent to the hydroxyl content in one gram of the polyol or other hydroxyl compound.

In some embodiments, the polyether polyol composition has an average nominal hydroxyl functionality of from 1.6 to 8. The polyether polyol may have a nominal hydroxyl functionality of from about 2 or greater (e.g., from 2 to 6, from 2 to 5, from 2 to 4, or 2). In some embodiments, the polyol composition has a nominal hydroxyl functionality of from 1.6 to 6, from 1.6 to 4, or from 1.6 to 3.5. By the term "nominal," it is meant the average hydroxyl functionality of the composition with the assumption that the average functionality of the polyol is identical to that average functionality (active hydrogen atoms per molecule) of the initiator as used in the preparation of the polyol. In practice, the average hydroxyl functionality may be somewhat less due to presence of some terminal unsaturation. The polyether polyol may have an average overall hydroxyl functionality of from about 2 to about 4.5 (e.g., 2 to 3.5). As used herein, the hydroxyl functionality (nominal and average overall) is the number of isocyanate reactive sites on a molecule, and may be calculated as the total number of moles of OH over the total number of moles of polyol.

The polyether polyol may have a molecular weight of from 1,000 g/mol to 12,000 g/mol. By the term "molecular weight," it is understood the theoretical molecular weight expressed in grams per mole and being calculated with consideration to the molecular weights and amounts of reactants from which the polyol is prepared. In some embodiments, the polyether polyol composition of various embodiments has a molecular weight of from 1,000 g/mol to 10,000 g/mol, from 2,000 g/mol to 9,000 g/mol, or from 2,500 g/mol to 8,000 g/mol. In some embodiments, the polyol component includes at least 50 wt % of a polyether polyol having a molecular weight of from 6,000 g/mol to 9,000 g/mol. For example, the polyol component may include from 50 wt % to 100 wt %, from 50 wt % to 90 wt %, from 50 wt % to 80 wt %, from 50 wt % to 70 wt %, from 60 wt % to 100 wt %, from 60 wt % to 90 wt %, from 60 wt % to 80 wt %, or from 60 wt % to 70 wt % of a polyether polyol having a molecular weight of from 6,000 g/mol to 9,000 g/mol.

In various embodiments, the polyether polyol includes a polyoxyethylene-polyoxypropylene polyol. Combinations of other polyether polyols, including monohydroxyl substances and low molecular weight diol and triol substances or amines, of varying functionality and polyoxyethylene content may be used in the formulation for preparing the polyurethane prepolymer.

According to embodiments, the polyol component includes at least one polyoxyethylene-polyoxypropylene polyol that has a polyoxyethylene content greater than 60 wt %, greater than 65 wt %, greater than 70 wt %, or at least 75 wt % based on a total weight of the polyoxyethylene-polyoxypropylene polyol. In various embodiments, the polyol component includes from 50 wt % to 100 wt % of the polyoxyethylene-polyoxypropylene polyol. A remainder of the weight content of the polyoxyethylene-polyoxypropylene polyol based on a total of 100 wt % may be accounted for with polyoxypropylene. For example, the polyoxyethylene-polyoxypropylene polyol may have a polyoxypropylene content of at least 5 wt % (e.g., at least 10 wt %, at least 15 wt %, and/or at least 20 wt %) and a polyoxyethylene content greater than 60 wt % or greater than 65 wt % based on a total weight of the polyoxyethylene-polyoxypropylene polyol. The polyoxyethylene-polyoxypropylene polyol may have an average nominal hydroxyl functionality from 1.6 to 3.5 (e.g., 2.5 to 3.5) and a number average molecular weight from 1,500 g/mol to 8,000 g/mol (e.g., 2,000 g/mol to 6,000 g/mol, 3,000 g/mol to 5,500 g/mol, 4,000 g/mol to 5,300 g/mol, etc.). The polyoxyethylene content of the individual polyols may be randomly distributed throughout the molecule. According to one embodiment, the polyol component consists essentially of the polyoxyethylene-polyoxypropylene polyol, and the polyol component has a polyoxyethylene content greater than 60 wt %, greater than 65 wt %, greater than 70 wt %, or at least 75 wt % based on a total weight of the polyol component. According to some embodiments, the polyol component includes from 50 wt % to 100 wt % of a polyoxyethylene-polyoxypropylene polyol that has polyoxyethylene content greater than 65 wt %, based on a total weight of the polyoxyethylene-polyoxypropylene polyol.

The polyether polyol used in various embodiments may be produced using standard processes known to those skilled in the art, or may be commercially available. In general, the polyether polyol may be obtained by reacting ethylene oxide and/or propylene oxide simultaneously and/or sequentially in any order with an initiator having 2 to 8 active hydrogen atoms. Such initiators may include water, ethylene glycol, propylene glycol, butanediol, glycerol, trimethyl propane, ethylene diamine, triethanolamine, sucrose and sorbitol.

The polyol component may include one or more polyester polyols having a hydroxyl equivalent weight of at least 500, at least 800, and/or at least 1,000. For example, polyester polyols known in the art for forming polyurethane polymers may be used. The polyol component may include polyols with fillers (filled polyols), e.g., where the hydroxyl equivalent weight is at least 500, at least 800, and/or at least 1,000. The filled polyols may contain one or more copolymer polyols with polymer particles as a filler dispersed within the copolymer polyols. Exemplary filled polyols include styrene/acrylonitrile (SAN) based filled polyols, polyharnstoff dispersion (PHD) filled polyols, and polyisocyanate polyaddition products (PIPA) based filled polyols. The polyol component may include a primary hydroxyl containing alcohol, such as a polybutadiene, a polytetramethylene ether glycol (PTMEG), a polypropylene glycol (PPG), a polyoxypropylene, and/or a polyoxyethylene-polyoxypropylene. In various embodiments, the polyol component includes from 25 wt % to 100 wt % of a polyol having a number average molecular weight of from 1,000 g/mol to 3,000 g/mol.

Alternatively, the polyol component may include one or more commercially available polyols. Exemplary available polyol based products include VORANOL™ products, TERAFORCE™ Polyol products, VORAPEL™ products, SPECFLEX™ products, VORALUX™ products, PARALOID™ products, HYPERLAST™ products, VORANOL™ VORACTIV™ products, UCON™ products, IP 010 Polyol products, and SPECFLEX™ ACTIV, available from The Dow Chemical Company.

In embodiments, the polyurethane prepolymer may further include one or more additives, such as, by way of example and not limitation, one or more catalysts, one or more cross-linkers, and/or one or more chain extenders. Other additives known in the art for use in forming prepolymers and polyurethanes may also be employed. For example, a surfactant or a thickening agent may be included. Examples of preferred surfactants are the block copolymers of oxyethylene and oxypropylene such as the Pluronic Polyol surfactants manufactured by BASF. Generally preferred are the non-ionic surfactants such as available under the Pluronic trade name and include the designated products L-62, L-72, L-92, P-75 or P-85. Other surfactants equivalent in nature or performance may be used in place of the mentioned substances.

Thickening agents may be present when it is desired to control the viscosity of the polyurethane prepolymer. Examples of thickening agents are natural products such as xanthan gums, or chemical agents such as polyacrylamide polymers and gels as sold by The Dow Chemical Company. Other additives which may also be present include mixing aids, emulsifiers, fatty acids, or other functional additives to modify physical properties of the resulting polymer. Additives, when included, may be present in an amount from 0.1 wt % to 10 wt % based on a total weight of the polyurethane prepolymer.

The polyurethane prepolymer is prepared in a conventional way by combining the isocyanate component and the polyol component (e.g., the polyether polyol) at 20-100° C. and, in some embodiments, in the presence of urethane-forming catalyst, such as a tertiary amine or tin compound. The relative amounts of the isocyanate component and the polyol component are chosen in such a way as to arrive at the desired free NCO content of the final product. In general, the equivalent amount of diisocyanate will be higher than the equivalent amount of the polyol component.

In embodiments, a plurality of infill granules are coated with the polyurethane prepolymer component, which is cured to form a preformed coating on the plurality of infill granules. In various embodiments, the infill granules are coated with the polyurethane prepolymer component using a mixer. For example, the polyurethane prepolymer component may be added to a mixer containing the infill granules and mixed until the granules are sufficiently coated. Other coating methods may be employed, provided the coating method coats the granules without causing them to stick together, which could result in a cured block of rubber coated with polyurethane.

The coated granules of various embodiments include from 1 wt % to 20 wt %, from 1 wt % to 15 wt %, from 1 wt %, to 10 wt %, from 5 wt % to 15 wt %, or from 5 wt % to 10 wt % of the polyurethane prepolymer component based on a total weight of the plurality of infill granules and polyurethane prepolymer component.

After coating, the polyurethane prepolymer may be cured by contacting the coated granules with a curative component. Suitable curatives include, for example, water or one or more polyols. In various embodiments, the curative component includes at least water. In embodiments, the polyurethane prepolymer may be cured by spraying the coated granules with water and agitating the granules to form the preformed coating on the granules. For example, a batch-type PLOUGHSHARE® mixer (Gebrüder Lödige Maschinenebau GmbH, Germany) or other mixer may be used to agitate the granules while water is sprayed with a discontinuous manual spray or injected into the mixer chamber.

Once cured, the coated granules of one or more embodiments described herein may be used as infill on an artificial turf surface. In various embodiments, the preformed coating accounts for from 1 wt % to 20 wt % of a total weight of the coated infill. In some embodiments, the preformed coating accounts for from 1 wt % to 15 wt % or from 1 wt % to 10 wt % of a total weight of the coated infill.

Referring to FIG. 1, depicted is a cutaway view of an artificial turf field 100 according to one or more embodiments shown and/or described herein. The artificial turf field 100 comprises a primary backing 105 having a top side 110 and a bottom side 115; and at least one artificial turf filament 120. As used herein, "filament" refers to monofilaments, multifilaments, extruded films, fibers, yarns, such as, for example, tape yarns, fibrillated tape yarn, slit-film yarn, continuous ribbon, and/or other stretched fibrous materials used to form synthetic grass blades or strands of an artificial turf field.

The at least one artificial turf filament 120 may include a polyolefin, a polyamide, a polyester, or a combination thereof. Polyolefins include polymers derived from one or more simple olefin monomers, such as ethylene, propylene, 1-butene, 1-hexene, or 1-octene. The olefin monomers may be substituted or unsubstituted, and if substituted, the substituents may vary depending on the particular embodiment. Suitable polyolefins may include polyethylene, polypropylene, polybutene, polyisoprene, and various interpolymers thereof. As used herein, "interpolymer" refers to polymers prepared by the polymerization of at least two different types of monomers. The term "interpolymer" can include copolymers, which is used to refer to polymers prepared from two different types of monomers, and can also include polymers prepared from more than two different types of monomers. Blends of polyolefins may also be used.

The at least one artificial turf filament 120 is affixed to the primary backing 105 such that the at least one artificial turf filament 120 provides a tufted face 125 extending outwardly from the top side 110 of the primary backing 105. As used herein, "affix," "affixed," or "affixing" includes, but is not limited to, coupling, attaching, connecting, fastening, joining, linking or securing one object to another object through a direct or indirect relationship. The tufted face 125 extends from the top side 110 of the primary backing 105, and can have a cut pile design, where the artificial turf filament loops may be cut, either during tufting or after, to produce a pile of single artificial turf filament ends instead of loops.

The primary backing 105 can include, but is not limited to, woven, knitted, or non-woven fibrous webs or fabrics made of one or more natural or synthetic fibers or yarns, such as polypropylene, polyethylene, polyamides, polyesters, and rayon. The artificial turf field 100 may further comprise a secondary backing 130 bonded to at least a portion of the bottom side 115 of the primary backing 105 such that the at least one artificial turf filament 120 is affixed in place to the bottom side 115 of the primary backing 105. The secondary backing 130 may comprise polyurethane (including, for example, polyurethane supplied under the name ENFORCER™ or ENHANCER™ available from The Dow Chemical Company) or latex-based materials, such as, styrene-butadiene latex, or acrylates.

The primary backing 105 and/or secondary backing 130 may have apertures through which moisture can pass. The apertures may be generally annular in configuration and are spread throughout the primary backing 105 and/or secondary backing 130. Of course, it should be understood that there may be any number of apertures, and the size, shape and location of the apertures may vary depending on the desired features of the artificial turf field 100.

The artificial turf field 100 may be manufactured by providing at least one artificial turf filament 120 and affixing the at least one artificial turf filament 120 to a primary backing 105 such that that at least one artificial turf filament 120 provides a tufted face 125 extending outwardly from a top side 110 of the primary backing 105. The artificial turf field 100 may further be manufactured by bonding a secondary backing 130 to at least a portion of the bottom side 115 of the primary backing 105 such that the at least one artificial turf filament 120 is affixed in place to the bottom side 115 of the primary backing 105.

The artificial turf field 100 may optionally comprise a shock absorption layer underneath the secondary backing of the artificial turf field. The shock absorption layer can be made from polyurethane, polyvinyl chloride (PVC) foam plastic or polyurethane foam plastic, a rubber, a closed-cell crosslinked polyethylene foam, a polyurethane underpad having voids, an elastomer foam of polyvinyl chloride, polyethylene, polyurethane, and/or polypropylene. Non-limiting examples of a shock absorption layer are the ENFORCER™ Sport Polyurethane Systems, and the ENHANCER™ Sport Polyurethane Systems (available from The Dow Chemical Company).

The artificial turf field 100 further comprises an infill material as described herein. For example, the coated infill granules described in various embodiments may be dispersed between the artificial turf filaments 120. The coated infill granules may help the artificial turf filaments 120 remain upright, control temperature, and weigh down the artificial turf field 100 to prevent the formation of wrinkles or ripples caused by movement.

The artificial turf field 100 may optionally comprise a drainage system. The drainage system allows water to be removed from the artificial turf field and prevents the field from becoming saturated with water. Nonlimiting examples of drainage systems include stone-based drainage systems, such as, for example, the EXCELDRAIN™ Sheet 100 drainage system, the EXCELDRAIN™ Sheet 200 drainage system, and the EXCELDRAIN™ EX-T STRIP drainage system (available from American Wick Drain Corp., Monroe, N.C.).

In various embodiments, the infill granules coated with the preformed coating are wetted prior to exposure to heat via infrared lamps and exhibit a $\Delta T$ that is at least 10° C. less than a $\Delta T$ of the plurality of granules prior to being coated after exposure to heat for about 2 hours. In some embodiments, the coated infill exhibits a $\Delta T$ that is at least 15° C. less than a $\Delta T$ of the plurality of granules prior to being coated after exposure to heat for about 2 hours. For example, the coated infill may exhibit a $\Delta T$ that is from 10° C. to 40° C. less than a $\Delta T$ of the plurality of granules prior to being coated after exposure to heat for about 2 hours, from 10° C. to 30° C. less than a $\Delta T$ of the plurality of granules prior to being coated after exposure to heat for about 2 hours, from 10° C. to 20° C. less than a $\Delta T$ of the plurality of granules prior to being coated after exposure to heat for about 2 hours, from 15° C. to 40° C. less than a $\Delta T$ of the plurality of granules prior to being coated after exposure to heat for about 2 hours, from 15° C. to 30° C. less than a $\Delta T$ of the plurality of granules prior to being coated after exposure to heat for about 2 hours, from 15° C. to 20° C. less than a $\Delta T$ of the plurality of granules prior to being coated after exposure to heat for about 2 hours, from 12° C. to 18° C. less than a $\Delta T$ of the plurality of granules prior to being coated after exposure to heat for about 2 hours, or from 13° C. to 18° C. less than a ΔT of the plurality of granules prior to being coated after exposure to heat for about 2 hours. In various embodiments, the ΔT is measured after exposure of the infill to IR lamps using IR thermometers, as will be described in greater detail below.

As described above, in various embodiments, the coated infill granules may be used in a synthetic turf. The type and volume of infill material, in addition to pile height, tufting density, and yarn strength, may influence the final deformation resistance of the turf. The Lisport test may be used to analyze wear performance, and is helpful to design an effective turf system. Additionally, tests may be performed to analyze temperature performance and aging, as well as the bounce and spin properties of the resulting turf. With regard to each of these properties, turf containing the coated infill as described above may meet FIFA specifications for the use of the turf in football fields (see, for example, the "March 2006 FIFA Quality Concept Requirements for Artificial Turf Surfaces," the FIFA handbook of test methods and requirements for artificial football turf, which is fully incorporated herein by reference).

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Prepolymer 1
Prepolymer 1 A diphenylmethane diisocyanate (MDI) based prepolymer having a target average isocyanate moiety (NCO) content of 9.5 wt % that is prepared according to the approximate formulation in Table 1, below.

TABLE 1

Table 1: Prepolymer Formulation 1

|  | Prepolymer Formulation 1 (wt %) |
|---|---|
| ISONATE ™ 50 O, P | 34.6 |
| UCON ™ PCL-270 | 65.4 |
| Benzoyl Chloride | 0.02 |

ISONATE ™ 50 O, P
A MDI based mixture including on average 50 wt % 4,4'-diphenylmethane diisocyanate and 50 wt % of 2,4'-diphenylmethane diisocyanate and having an average NCO content of 33.5 wt % (available from The Dow Chemical Company).
UCON ™ PCL-270
A lubricant polyol that is an ethyleneoxide-propyleneoxide copolymer, having an average nominal hydroxyl functionality of 2 and a number average molecular weight of 2,400 g/mol (available from The Dow Chemical Company).
Benzoyl Chloride
A 99 wt % solution of benzoyl chloride (available from Sigma-Aldrich).

Prepolymer 1 with a target NCO content of 9.5 wt % is prepared according to Table 1, above. The NCO content is measured according to ASTM D5155.
Prepolymer 2
Prepolymer 2 A diphenylmethane diisocyanate (MDI) based prepolymer having a target average isocyanate moiety (NCO) content of 5.4 wt % that is prepared according to the approximate formulation in Table 2, below.

TABLE 2

Table 2: Prepolymer Formulation 2

|  | Prepolymer Formulation 2 (wt %) |
|---|---|
| ISONATE ™ 125M | 22 |
| UCON ™ PCL-270 | 30 |
| IP 010 Polyol | 48 |
| Benzoyl Chloride | 0.02 |

ISONATE ™ 125M
A MDI based mixture including on average 98 wt % 4,4'-diphenylmethane diisocyanate and 2 wt % of 2,4'-diphenylmethane diisocyanate and having an average NCO content of 33.5 wt % (available from The Dow Chemical Company).
UCON ™ PCL-270
A lubricant polyol that is an ethyleneoxide-propyleneoxide copolymer, having an average nominal hydroxyl functionality of 2 and a number average molecular weight of 2,400 g/mol (available from The Dow Chemical Company).
IP 010 Polyol
A glycerin initiated polyoxyethylene-polyoxypropylene polyol having an average nominal hydroxyl functionality of 3 and a number average molecular weight of 7,800 g/mol (available from The Dow Chemical Company).
Benzoyl Chloride
A 99 wt % solution of benzoyl chloride (available from Sigma-Aldrich).

Prepolymer 2 with a target NCO content of 5.4 wt % is prepared according to Table 1, above. The NCO content is measured according to ASTM D5155.

To prepare Prepolymers 1 and 2, the required amount of polyols according to Tables 1 and 2, respectively, are added to a reactor to form a first mixture that is heated to 50° C. with continuous stirring and nitrogen purging overnight. Then, the water content is measured to make sure it is less than 250 ppm, and the mixture is stirred for 15 min. Also, ISONATE™ 125 M and ISONATE™ 50 O,P are added along with Benzoyl Chloride to a four neck flask to form a second mixture, which is heated to 50° C. Next, the first mixture is added to the second mixture and the resultant mixture is heated to 75° C. and maintained at that temperature for three hours. Thereafter, the temperature of the resultant mixture is lowered and the prepolymer is dispensed into a glass bottle.

Comparative Formulation
VORAMER™ RF 1024 Isocyanate is a prepolymer having a viscosity of about 3,000 mPa·s at 20° C. and a mean NCO % of approximately 14.8%, available from The Dow Chemical Company.

Example 1

Table 3 below lists Samples 1-4, which are four example embodiments of the present formulations that include a preformed coating on SBR granules. The amounts reported in Table 3 represent the wt % of each component before curing.

TABLE 3

Table 3: Infill Compositions

| Composition | Sample 1 | Sample 2 | Sample 3 | Sample 4 |
|---|---|---|---|---|
| SBR granules | 87 | 91 | 91 | 95 |
| Prepolymer 1 | 0 | 0 | 9 | 5 |
| Prepolymer 2 | 13 | 9 | 0 | 0 |

The infill compositions of Samples 1-4 are prepared by loading SBR granules into a horizontal mixer. For Samples 1-4, the polyurethane prepolymer is poured into the mixer in the amounts reported in Table 3, and mixed for 5 minutes at 185 rpm. Next, water is sprayed onto the samples to allow the prepolymer to cure while mixing at 185 rpm for 45 minutes.

The infill compositions of Samples 1-4 and Comparative Sample A (uncoated SBR granules) are exposed to two 275 W IR lamps over an exposed surface of 30×50 cm². The granules of Samples 1-4 and Comparative Sample A are preliminarily soaked in water for 15 minutes prior to exposure to the IR lamps, then allowed to drain for 15 minutes. The temperature on the surface exposed to IR is monitored over a two hour period using an IR thermometer.

Figure 2:
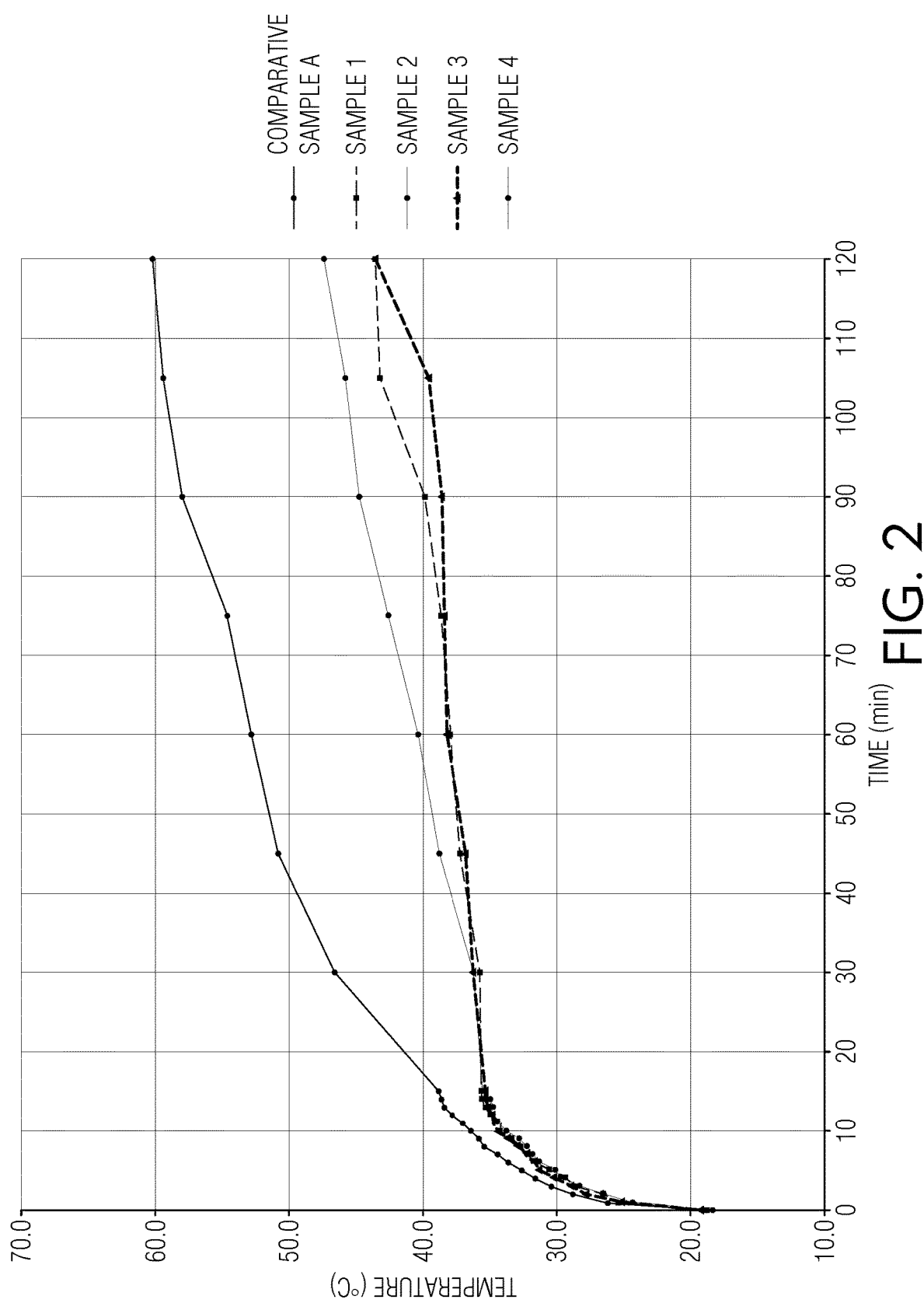
FIG. 2 is a graph depicting the temperature (in ° C.; Y-axis) as a function of time (in minutes; X-axis) of exposure to infrared (IR) for Samples 1-4 and Comparative Sample A.

FIG. 2 depicts the results of the temperature evaluation. In particular, FIG. 2 is a graph depicting the temperature (in ° C.) as a function of time (in minutes) of exposure to IR. As shown in FIG. 2, a difference (ΔT) of about 10-15° C. is observed between the coated granules of Samples 1-4 and the uncoated granules of Comparative Sample A. Moreover, Samples 3 and 4 demonstrate that Prepolymer 1 performs similarly at 5 wt % and 9 wt % based on a total weight of the uncured coated SBR granules.

Example 2

Next, mixtures including Prepolymer 1 or 2 and standard polyurethane prepolymers are tested as coatings for SBR granules. Table 4 below lists Comparative Samples B-E, which are four comparative samples that include a preformed coating including mixtures including Polymers 1 or 2 and standard polyurethane prepolymers on SBR granules. The amounts reported in Table 4 represent the wt % of each component before curing.

TABLE 4

Table 4: Infill Compositions

| Composition | Comp. Sample B | Comp. Sample C | Comp. Sample D | Comp. Sample E |
|---|---|---|---|---|
| SBR granules | 91 | 87 | 87 | 90 |
| Prepolymer 1 | 0 | 0 | 9 | 9 |
| Prepolymer 2 | 5 | 9 | 0 | 0 |
| VORAMER ™ RF 1024 | 4 | 4 | 4 | 1 |

Figure 3:
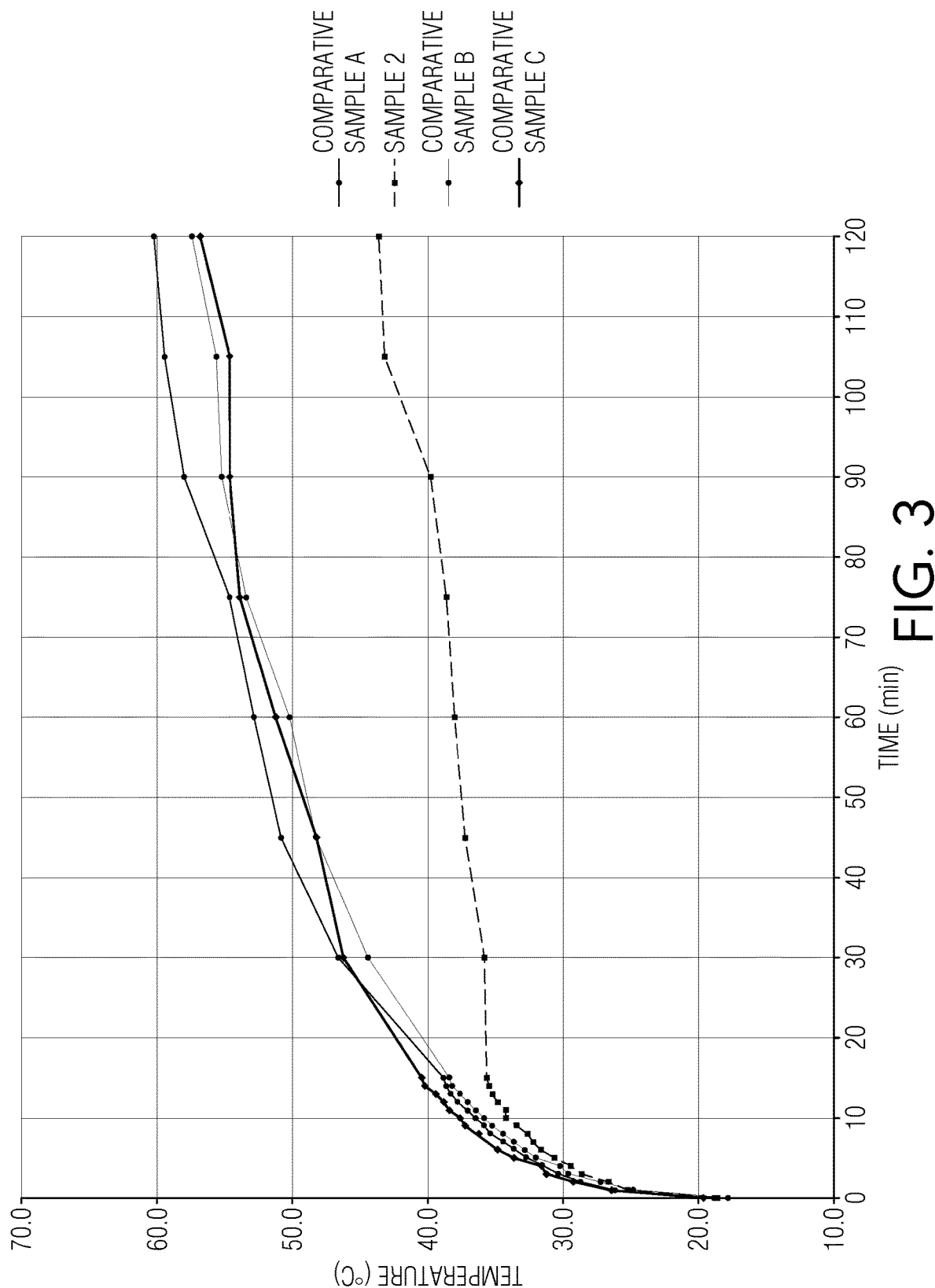
FIG. 3 is a graph depicting the temperature (in ° C.; Y-axis) as a function of time (in minutes; X-axis) of exposure to IR for Sample 2 and Comparative Samples A-C.
Figure 4:
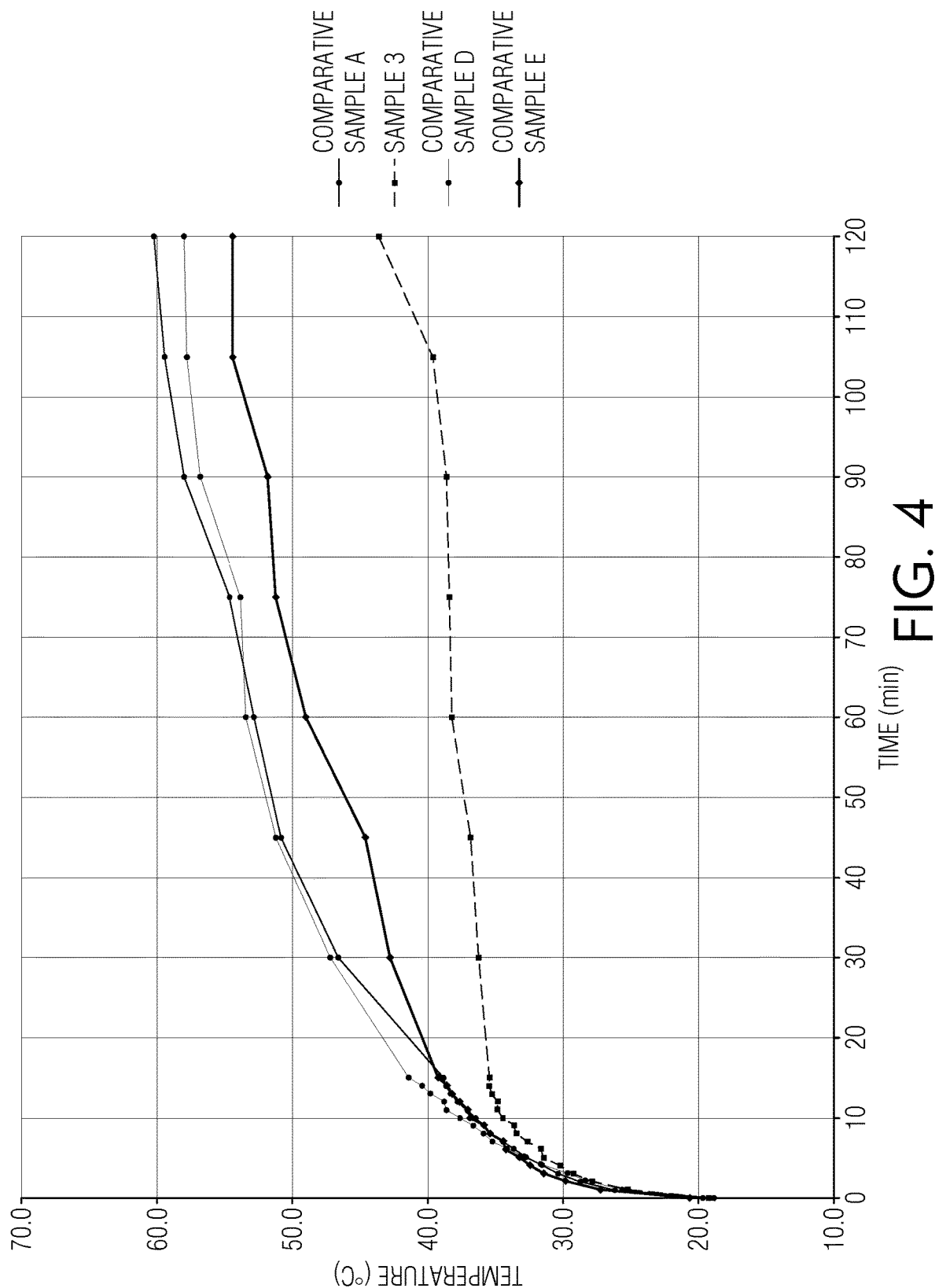
FIG. 4 is a graph depicting the temperature (in ° C.; Y-axis) as a function of time (in minutes; X-axis) of exposure to IR for Sample 3 and Comparative Samples A, D, and E.

For each of Comparative Samples B-E, the SBR granules are coated as provided in Example 1. Each sample is then exposed to IR as provided above and the temperature elevation is monitored. FIGS. 3 and 4 depict the results of the temperature evaluation.

In particular, FIG. 3 is a graph depicting the temperature (in ° C.) as a function of time (in minutes) of exposure to IR for Sample 2 and Comparative Samples A-C. As shown in FIG. 3, a difference (ΔT) of about 10-15° C. is observed between the coated granules of Sample 2 and the uncoated granules of Comparative Sample A, consistent with the results of Example 1 above. However, the observed ΔT of Comparative Samples B and C is significantly less, representing a temperature control nearly equivalent to the uncoated SBR granules of Comparative Sample A. Thus, although an improvement in temperature control was expected because of the addition of Prepolymer 2 in the coating, the use of the standard polyurethane prepolymer in the coating negates the presence of Prepolymer 2, and the coating provides no improvement when compared to uncoated granules.

Similarly, FIG. 4 is a graph depicting the temperature (in ° C.) as a function of time (in minutes) of exposure to IR for Sample 3 and Comparative Samples A, D and E. As shown in FIG. 4, a difference (ΔT) of about 10-15° C. is observed between the coated granules of Sample 3 and the uncoated granules of Comparative Sample A, consistent with the results of Example 1 above. However, the observed ΔT of Comparative Samples D and E is significantly less, representing a temperature control nearly equivalent to the uncoated SBR granules of Comparative Sample A. Thus, although an improvement in temperature control was expected because of the addition of Prepolymer 1 in the coating, the use of the standard polyurethane prepolymer in the coating negates the presence of Prepolymer 1, and the coating provides no improvement when compared to uncoated granules.

Various embodiments described herein exhibit a ΔT of at least 10° C. as compared to uncoated infill granules. Accordingly, various embodiments described herein may be employed in artificial turf applications to control temperature without adversely impacting the mechanical performance of the artificial turf, including shock absorption, vertical ball rebound, vertical deformation, and rotational resistance.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

The invention claimed is:

1. Coated infill granules for dispersing between artificial turf filaments, the coated infill granules comprising:
    a plurality of infill granules; and
    a preformed coating formed on the infill granules prior to dispersing the coated infill granules between artificial turf filaments, the preformed coating comprising a cured polyurethane product of at least a polyurethane prepolymer component and a curative component, wherein:
        the polyurethane prepolymer component includes at least one polyurethane prepolymer that comprises a reaction product of an isocyanate component comprising diphenylmethane diisocyanate (MDI) and a polyol component, the polyurethane prepolymer having a free isocyanate content (% NCO) from 2 wt % to 12 wt %; and
        the curative component includes at least water;
    wherein the polyol component includes from 50 wt % to 100 wt % of a polyoxyethylene-polyoxypropylene polyol that has polyoxyethylene content greater than 65 wt %, based on a total weight of the polyoxyethylene-polyoxypropylene polyol.

2. The coated infill granules of claim 1, wherein the preformed coating accounts for from 1 wt % to 20 wt % of a total weight of the coated infill granules.

3. The coated infill granules of claim 1, wherein from 1 wt % to 20 wt % of the polyurethane prepolymer component is used to form the preformed coating, based on a total weight of the plurality of infill granules and polyurethane prepolymer component.

4. The coated infill granules of claim 1, wherein from 5 wt % to 10 wt % of the polyurethane prepolymer component is used to form the preformed coating, based on a total weight of the plurality of infill granules and polyurethane prepolymer component.

5. The coated infill granules of claim 1, wherein the polyoxyethylene-polyoxypropylene polyol has a number average molecular weight of from 1,000 g/mol to 3,000 g/mol.

6. The coated infill granules of claim 1, wherein the polyoxyethylene-polyoxypropylene polyol has a molecular weight of from 6,000 g/mol to 9,000 g/mol.

7. The coated infill granules of claim 1, wherein the plurality of infill granules comprise rubber or elastomer granules.

8. A method for making an artificial turf surface using coated infill granules, the method comprising:

coating a plurality of infill granules with a polyurethane prepolymer component including consisting of at least one polyurethane prepolymer that comprises a reaction product of an isocyanate component comprising diphenylmethane diisocyanate (MDI) and a polyol component, the polyurethane prepolymer having a free isocyanate content (% NCO) from 2 wt % to 12 wt %;

curing the polyurethane prepolymer with a curative component that includes at least water to form a preformed coating on the plurality of infill granules; and dispersing the coated infill granules having the preformed coating between a plurality of artificial turf filaments affixed to a primary backing.

9. The method of claim 8, wherein curing the polyurethane prepolymer comprises spraying the curative component after coating the plurality of infill granules with the polyurethane prepolymer component.

10. The method of claim 8, wherein the polyol component includes from 50 wt % to 100 wt % of a polyoxyethylene-polyoxypropylene polyol that has polyoxyethylene content greater than 65 wt %, based on a total weight of the polyoxyethylene-polyoxypropylene polyol.

11. The coated infill granules of claim 1, wherein the polyurethane prepolymer component consists of the at least one polyurethane prepolymer.

12. The method of claim of claim 8, wherein the polyurethane prepolymer components consists of the at least one polyurethane prepolymer.

* * * * *